Sept. 3, 1957  J. D. KIRSCHMANN  2,804,998
FERTILIZER SPREADER
Filed Dec. 12, 1955.  2 Sheets-Sheet 1

John D. Kirschmann
INVENTOR.

BY *Clarence A. O'Brien*
*and Harvey B. Jacobson*
Attorneys

Sept. 3, 1957 J. D. KIRSCHMANN 2,804,998
FERTILIZER SPREADER
Filed Dec. 12, 1955 2 Sheets-Sheet 2

John D. Kirschmann
INVENTOR.

United States Patent Office — 2,804,998 — Patented Sept. 3, 1957

2,804,998
FERTILIZER SPREADER
John D. Kirschmann, Regent, N. Dak.

Application December 12, 1955, Serial No. 552,321

6 Claims. (Cl. 222—177)

This invention comprises novel and useful improvements in a fertilizer spreader and more particularly relates to a fertilizer cart having improved means for automatically dispensing an adjustable quantity of fertilizer in response to movement of the cart.

The principal object of this invention is to provide a fertilizer dispenser of an inexpensive and simple construction and yet which will enable fertilizer to be accurately and adjustably dispensed therefrom.

A further object of the invention is to provide a device in accordance with the foregoing object in which the dispensing mechanism is provided with a yieldable safety release construction.

Yet another object of the invention is to provide an improved fertilizer dispenser in conformity with the above mentioned objects and having means whereby the rate at which fertilizer is dispensed may be accurately measured.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
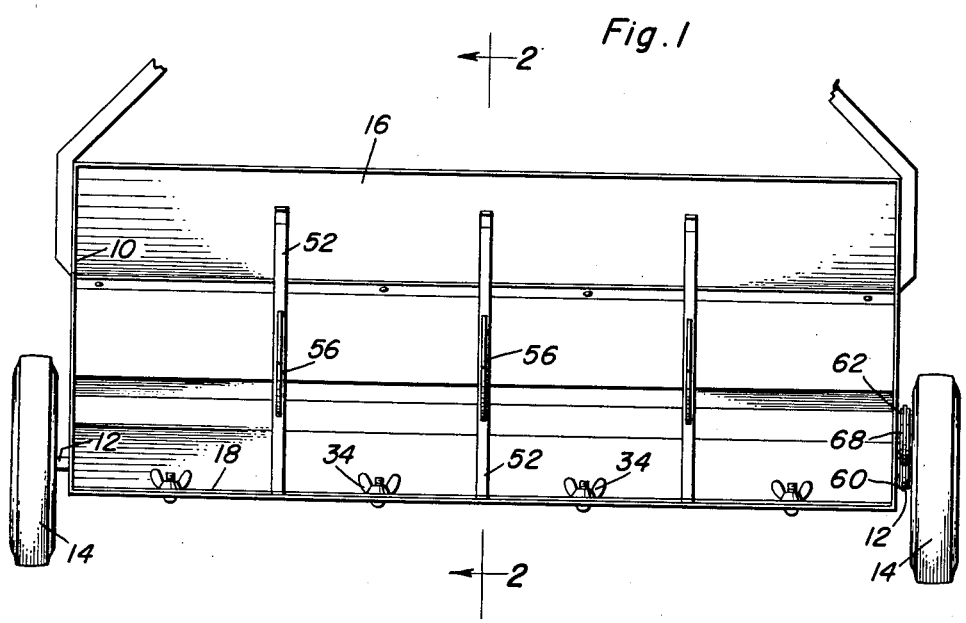
Figure 1 is a rear elevational view of a portion of a fertilizer dispenser incorporating therein the principles of this invention.
Figure 6:
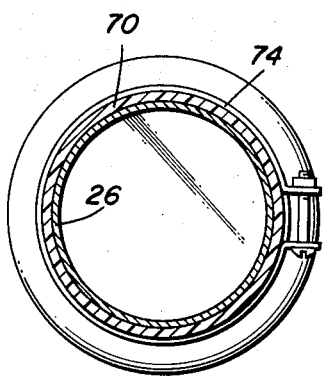
Figure 5:
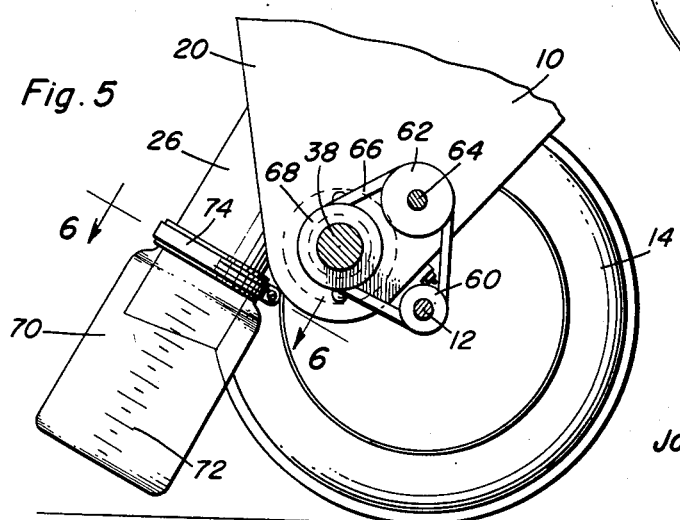

Figure 5 is a detailed view taken in vertical section substantially upon the plane indicated by the section line 5—5 of Figure 1 and showing the mechanism for adjustably driving the distributing auger of the device; and, Figure 6 is a sectional view taken substantially upon the plane indicated by the section line 6—6 of Figure 5 and showing the manner in which a gauge device is detachably secured to the discharge means of the dispensing device.

In accordance with this invention there is provided in the form of a cart consisting of a hopper 10 mounted by supporting axle or axles 12 upon supporting and driving wheels 14. Any desired means may be provided for propelling the cart and a distributing means is provided whereby fertilizer may be dispensed from the cart and spread over a field over which the cart is propelled.

Figure 3:
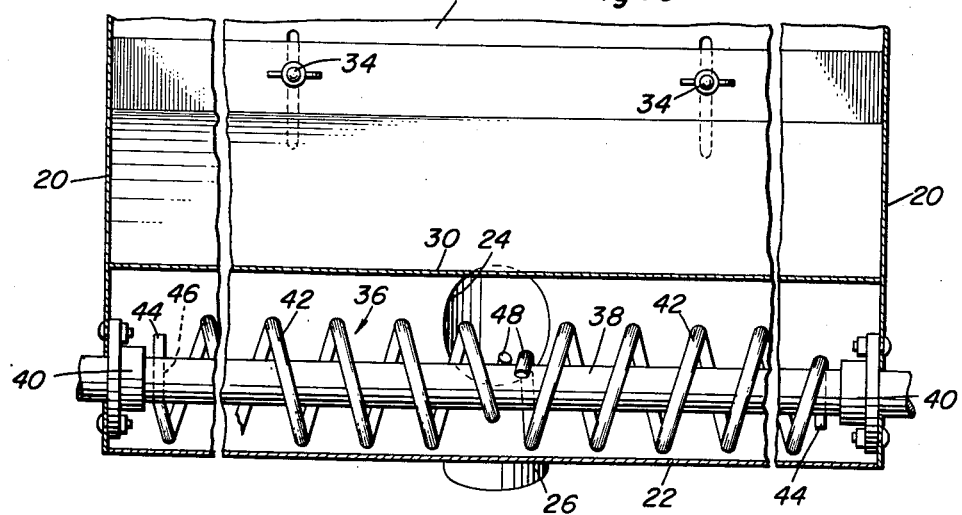
Figure 3 is a vertical transverse sectional view taken substantially upon the plane indicated by the section line 3—3 of Figure 2, parts being broken away, and showing in particular the construction of the dispensing auger of the device.
Figure 2:
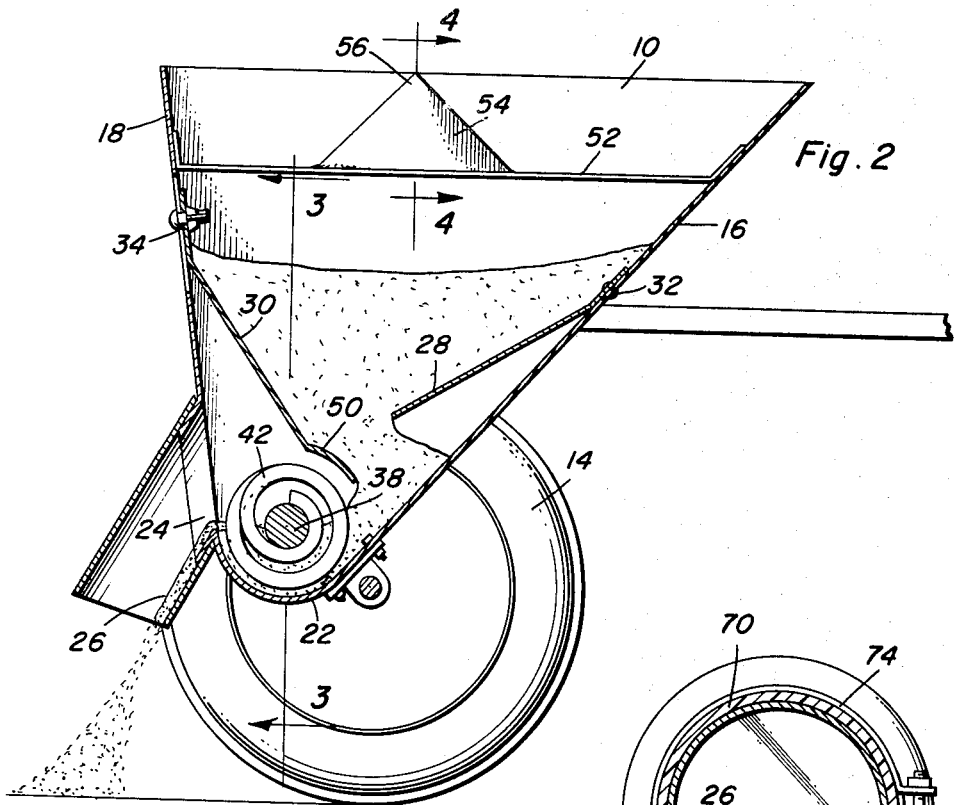
Figure 2 is a vertical longitudinal sectional view taken substantially upon the plane indicated by the section line 2—2 of Figure 1 and showing the internal construction of the hopper and the dispensing mechanism therefor.

Referring now especially to Figure 2, it will be seen that the hopper has relatively inclined and downwardly converging front and rear walls 16 and 18, respectively, together with side walls 20 as shown in Figure 3. At their lower end, the front and rear walls are formed into a transversely extending trough 22 which at its mid-portion is provided with a discharge opening 24 having a discharge conduit 26 associated therewith. Overlying the trough are a pair of transversely extending baffles or plates 28 and 30 which are mounted upon the front and rear walls as by fasteners 32 and 34, respectively. Extending through the trough 22 is a distributing auger indicated generally by the numeral 36. This auger conveniently comprises a shaft 38 which is rotatably supported and journaled in the side walls 20 as by journal bearings or bushings 40. A spiral member, preferably in the form of two axially aligned sections each generally indicated by the numeral 42 is provided and surrounds the auger shaft 38. One end of each section such as that indicated at 44 adjacent the side walls is secured in a diametrical bore 46 through the shaft 38 to thereby anchor the auger section thereto. The other end of the auger spiral member section, as indicated by the numeral 48, is disposed substantially at the mid-portion of the shaft 38, adjacent the discharge opening 24, and is formed by a convolution which tightly frictionally embraces the shaft 38. Preferably the two sections are given a pitch whereby fertilizer in the trough will be fed from both sides thereof towards the middle and the outlet 24.

As will now be apparent from Figure 2, the lower end of the baffle 28 terminates in spaced relation to a transversely extending, downwardly curving lip portion 50 of the baffle 30, this lip portion being in close overlying relation to the spiral sections 42. The space between the baffles 28 and 30 constitutes a throat which will restrict and limit the flow of the fertilizer from the hopper downwardly along the side wall 16 and into the trough.

Figure 4:
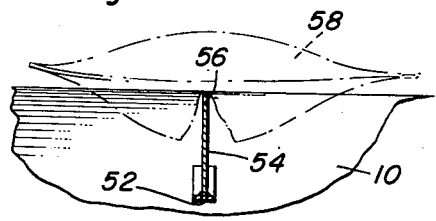
Figure 4 is a detailed view taken substantially upon the plane indicated by the section line 4—4 of Figure 2 and illustrating the manner in which a sack of fertilizer may be opened for discharging its contents into the hopper of the device.

Extending horizontally across the upper portion of the hopper 10 is a support bar 52 upon which is mounted a triangular shaped plate 54 having an upwardly directed point 56. As shown in Figure 4, this blade functions to rupture a sack 58 of fertilizer or the like whereby its contents may be discharged below the blade into the upper end of the hopper.

Reference is next made more particularly to Figure 5, wherein it will be seen that the axle 14, which is suitably journaled in a side wall 20 of the hopper, is provided with a driving pulley 60. A slack take-up or idler pulley 62 is carried by a stub axle 64 which is adjustably mounted in any desired manner upon the side wall 20 of the hopper and a driving belt 66 is entrained over these pulleys and over a driven pulley 68 which is secured to the extending end of the auger shaft 38. At this point it should be observed that the pulley 68 is a variable or adjustable pulley of any desired character whereby the effective diameter of the pulley can be varied or adjusted in order to change the speed or ratio between the driving pulley 60 and the auger shaft 38.

By properly adjusting the diameter of the pulley 68, it is possible to rotate the auger shaft at varying speeds relative to the speed or rotation of the axle and supporting wheel, and thus it is possible to adjust the delivery of the fertilizer spreader as the same covers a given area.

In order to enable a more precise adjustment of the rate of delivery of the spreader, a graduated measuring container 70 in the form of a glass jar or the like having graduations 72 thereon is provided for encircling the discharge end of the spout 26, a retaining clamp 74 being provided for securing the jar 70 to the discharge spout 26. When it is desired to regulate the output of the auger, the measuring jar 70 is clamped to the discharge spout 26 and the quantity of fertilizer delivered by the auger for a given distance of travel can then be accurately measured and the driving means for the auger can then be adjusted.

As clearly shown in the drawings, the discharge opening is so positioned that its lower edge lies in the horzontal plane through the axis of the shaft 38, while its upper edge is disposed considerably above this shaft. The opening is thereby so located as to prevent the free flow and loss of material therethrough, whereby the rate of discharge will be directly controlled by the speed of rotation of the shaft 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fertilizer spreader including a cart having a hopper for receiving fertilizer and an axle with a supporting wheel thereon, said hopper having a trough at its lower portion, an auger in said trough and extending through the sides of the hopper, a pair of baffles in said hopper and extending in vertically spaced relation from opposite sides thereof and disposed above said auger to provide a continuous throat extending the full length of the auger for feeding fertilizer from the hopper to the auger, driving means connecting the axle directly with said auger, a discharge means opening from a side wall of said trough and above the bottom wall of the same for receiving and discharging fertilizer fed thereto by said auger.

2. A fertilizer spreader including a cart having a hopper for receiving fertilizer and an axle with a supporting wheel thereon, said hopper having a trough at its lower portion, an auger in said trough and extending through the sides of the hopper, baffles in said hopper disposed above said auger to provide a throat for feeding fertilizer from the hopper to the auger, driving means connecting the axle with said auger, a discharge means opening from said trough for receiving and discharging fertilizer fed thereto by said auger, a measuring device, means for securing said measuring device to said discharge means.

3. The combination of claim 1 wherein said auger includes a shaft, a spiral member loosely encircling said shaft.

4. The combination of claim 1 wherein said auger includes a shaft, a spiral member loosely encircling said shaft, and having one end fixedly secured to said shaft.

5. The combination of claim 1 wherein said auger includes a shaft, a spiral member loosely encircling said shaft, and having one end fixedly secured to said shaft, the other end of said member frictionally embracing said shaft.

6. In a fertilizer distributor, a hopper having side walls and downwardly convergent front and rear walls between said side walls joined together by a rounded bottom wall portion defining a trough in the lower region of the hopper, a combined feeding and distributor unit mounted in said trough and including a shaft extending between said side walls in the lower region of said hopper and journalled for rotation about an axis parallel to the rounded inner surface of said bottom wall portion, auger elements mounted substantially concentrically on said shaft and including a least one pair of adjacent spiral members extending in opposite directions about said shaft so as to feed material inwardly toward the adjacent ends thereof, said front wall having a discharge opening therein opposite said adjacent ends of the spiral elements and having its lower edge disposed above the level of the lowermost portions of said spiral elements, a plate-like baffle assembly extending throughout the length of said auger elements and having its upper edge secured to said front wall above the level of the upper portions of said spiral members, said baffle extending downwardly from its upper edge over said feeding and distributor unit to terminate in a lower marginal edge portion spaced from said rear wall below the level of the upper portions of said spiral members and on the rear side thereof to define an isolated region above said feeding and distributor unit, said lower marginal edge portion of the baffle and the hopper wall portion immediately opposite thereto being downwardly convergent to define a wedge shaped entrance to said feeding and distributor unit, and means for rotating said feeding and distributor unit in a direction such as to feed material from said entrance, under said unit and out said discharge opening.

References Cited in the file of this patent

UNITED STATES PATENTS

| | | |
|---|---|---|
| 18,495 | Boyer et al. | Oct. 27, 1857 |
| 1,947,379 | Cargill | Feb. 13, 1934 |
| 2,206,985 | Vogt | July 9, 1940 |
| 2,522,693 | Stiteler | Sept. 19, 1950 |
| 2,538,886 | Skibbe et al. | Jan. 23, 1951 |
| 2,631,760 | Hoppes | Mar. 17, 1953 |
| 2,657,831 | Pierce | Nov. 3, 1953 |

FOREIGN PATENTS

| | | |
|---|---|---|
| 716,743 | Great Britain | Oct. 13, 1954 |